United States Patent [19]
Rowe

[11] 3,767,558
[45] Oct. 23, 1973

[54] SILVER RECOVERY SYSTEM
[75] Inventor: Murray Edwin Rowe, Ottawa, Ontario, Canada
[73] Assignee: Ainsley-Park Industries Ltd., Ottawa, Ontario, Canada
[22] Filed: Jan. 25, 1971
[21] Appl. No.: 109,445

[52] U.S. Cl. ............... 204/269, 204/109, 204/275, 204/272
[51] Int. Cl. .......................... C23b 5/68, C22d 1/12
[58] Field of Search ................... 204/228, 263, 272, 204/109-111, 275, 257, 260, 269

[56] References Cited
UNITED STATES PATENTS

| | | | |
|---|---|---|---|
| 3,477,926 | 11/1969 | Snow et al. | 204/109 |
| 3,315,270 | 4/1967 | Hersch | 204/260 |
| 2,606,148 | 8/1952 | Portanova et al. | 204/260 |
| 1,176,541 | 3/1916 | Gibbs | 204/260 |
| 1,075,026 | 10/1913 | Du Bois | 204/260 |
| 914,856 | 3/1909 | Meyer | 204/260 |

Primary Examiner—John H. Mack
Assistant Examiner—R. L. Andrews
Attorney—Fetherstonhaugh & Co.

[57] ABSTRACT

A non-agitated electrolytic cell for the recovery of silver from photographic chemical solutions which comprises a vertical tubular cathode enclosing an anode. The cell is operated at a low current density of between 50 and 100 milliamps per square foot of effective cathode area and the solution rich in silver is supplied continuously or in batches to the lower end of the cell, while the solution depleted of its silver content flows simultaneously from the top of the cell. For processing larger volumes of solution a cellular cathode assembly is used defining a bank of such cathode cells, there being a corresponding anode assembly with an anode disposed in each cell. The anodes are connected in isolated groups, each group being placed in circuit with an overload protection device, so that occurrence of a short-circuit in one group of anodes does not affect the operation of the remaining groups.

2 Claims, 5 Drawing Figures

PATENTED OCT 23 1973

INVENTOR
MURRAY E. ROWE
BY Fetherstonhaugh & Co.
ATTORNEYS.

SILVER RECOVERY SYSTEM

BACKGROUND OF THE INVENTION

1. Field of the Invention

This invention relates to a method and apparatus for the recovery of metals from electrolytic solutions, especially for the electro-winning of silver from photographic fixing solutions.

2. Description of the Prior Art

In developing photographic film silver compounds are dissolved into the fixing solution to an extent where the silver reduces the effectiveness of the solution.

It is known to remove silver electro-chemically from the used fixing solution to provide a silver free solution which can be replenished by the addition of suitable quantities of fixing chemicals, and reused. The silver recovered by this process is relatively pure, for example, about 97 percent pure silver.

A silver recovery system is described in the disclosure of U.S. Pat. No. 3,003,942, N. J. Cedrone, Oct. 10, 1961, that system is designed to operate at high current densities and requires the constant physical agitation of the electrolytic solution, and involves a relatively complex apparatus which requires considerable supervision and maintenance.

Silver Recovery Units have also been produced and used which feature a tank containing alternate cathode and anode plates, and which will recover silver at low current densities without agitation of the liquid. Without the special features provided by this invention, however, the prior devices were of excessive physical size in order to provide sufficient cathode area, and were prone to the loss of silver at the overflow due to lack of an effective means of concentrating the silver at the bottom of the tank.

It is an object of the present invention to provide a method and apparatus for the efficient recovery of metal from electrolytic solutions employing a non-agitated electrolytic cell at low current densities in the range 50 to 100 milliamps per square foot of effective cathode area, and to be of such design to permit a large cathode area per unit volume of container, and to provide a means of reducing the loss of silver solutions at the overflow drain.

SUMMARY OF THE INVENTION

The present invention, therefore, provides a method of recovering metal from an electrolytic solution containing ions of said metal, comprising supplying said solution to the bottom of a non-agitated electrolytic cell, said cell being of vertically elongated form and comprising a central anode enclosed by a cathode, applying a potential across said cell sufficient to cause a current to flow through said electrolytic solution at a density of between about 50 and about 100 milliamps per square foot of effective cathode area to deposit said metal upon said cathode thereby depleting said solution of said metal continuously as the solution passes upwardly from the bottom of the cell, and drawing off depleted solution from the top of the cell, and adjusting the rate at which said solution is supplied to the bottom of the cell to a value such that substantially complete recovery of said metal by deposition on the cathode is achieved. It would be possible to operate the cell at current densities significantly greater than 100 milliamps per square foot, however, at such higher current densities there is an increasing tendency to produce sulphiding of the silver, and for this reason the current density should not be greater than about 100 milliamps per sqare foot. The lower limit of 50 milliamps per square foot is an arbitrary figure, below which the recovery rate of silver is inordinately low, thus wasting cathode area.

From another aspect, the invention provides electro-winning apparatus comprising a tank, a cellular cathode assembly in said tank defining a plurality of vertically elongated electrolytic cells, an anode assembly in said tank comprising a plurality of elongated anodes each supported centrally in a corresponding one of said cells in non-rotating relationship thereto, means for supplying electrolyte to the lower end of said cells and means for removing electrolyte from the upper end of said cells.

Preferably the anodes are suspended to hang freely within their respective cells since this arrangement reduces the likelihood of the cell being short-circuited should a piece of plated silver become dislodged from the cathode, in that the anode can be displaced laterally to permit the displaced silver to fall to the bottom of the cell.

The cathode assembly is preferably of stainless steel and defines a cellular structure having a large number of electrically interconnected cathode cells. The anodes are preferably arranged in groups which are electrically isolated from each other, overload protection means being incorporated in the circuit of each anode group such that the occurrence of a short-circuit in one anode group does not interrupt operation of the cells containing anodes of the remaining groups.

The lower ends of the anode and cathode assemblies are preferably spaced an appreciable distance above the bottom of the tank to avoid the likelihood of short-circuit being caused by "plate outs" (i.e. pieces of electro—deposited metal which become dislodged from the cathode) which fall to the bottom of the tank.

BRIEF DESCRIPTION OF THE DRAWINGS

The invention will further be described, by way of example only, with reference to the accompanying drawings in which.

DESCRIPTION OF THE PREFERRED EMBODIMENTS

Figure 1:
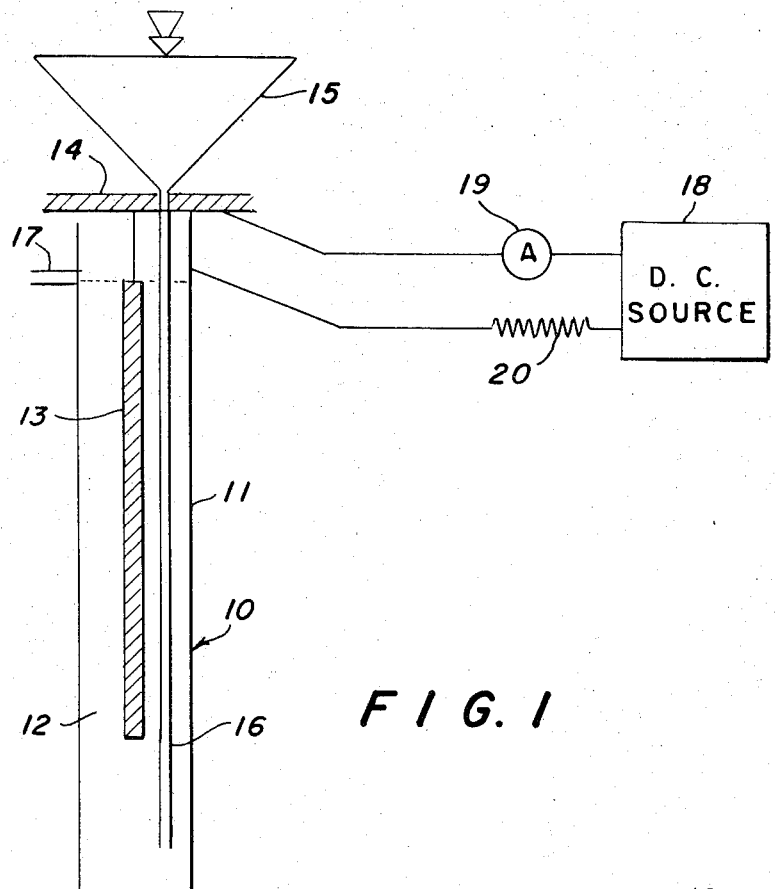
FIG. 1 is a somewhat schematic representation of an electrolytic cell for use in the method of this invention.
Figure 2:
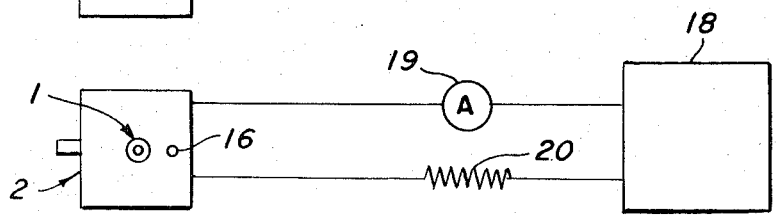
FIG. 2 is a corresponding plan view.

Referring first to FIGS. 1 and 2 there is shown a single cell of an electrolytic apparatus comprising a cathode 11 of stainless steel defining a vertically elongated vessel of square tubular cross-section containing an electrolytic solution in the form of a silver-bearing spent photographic chemical a main constituent of which is sodium thiosulphate. An anode 13 is suspended to hang freely centrally within the cathode 11 from a conducting rod 14, the lower end of the anode being spaced some distance above the bottom of the cathode 11.

The electrolytic solution is supplied to the cell through a fluid input means 15 illustrated as a funnel, from the lower end of which extends a tube 16 which conducts the input of electrolyte to the bottom of the cell.

The anode 13 is preferably a cylindrical graphite rod, and just above the upper end of the anode the cell is provided with means for removing the electrolyte solution, this means being in the form of an overflow outlet 17.

The cell is connected to an unfiltered d.c. power source 18, the anode being connected through a meter 19, and the cathode being connected through a resistor 20. The resistor 20 functions as a circuit overload protection device in that it is selected to be capable of dissipating all of the energy in the event of a short-circuit occurring in the electrolytic cell. Thus, the d.c. power source is selected to apply voltage wyich is approximately 10 times the voltage required to operate the electrolytic cell, the resistor value being selected such that the voltage drop across it is approximately 90 percent of the voltage of the d.c. source.

In use the cell illustrated in FIGS. 1 and 2 is operated at a low current density, i.e. between 50 and 100 milliamps per square foot of effective cathode area, and without agitation of the electrolyte.

Under these conditions a surprising effect is noted. This is that although in the unenergized condition of the cell the concentration of silver in the electrolyte is substantially uniform in all depths in the cell, upon energization of the cell to electro-deposit silver on the cathode, the concentration of silver in the solution towards the upper end of the cell becomes depleted, the silver concentration towards the lower end of the cell being correspondingly enriched. As operation of the cell is continued, the silver concentration is reduced through electro-deposition of the silver on the cathode, until a stage is reached at which the electrolytic solution at the upper end of the cell is virtually free of silver, although a significant, and progressively increasing concentration of silver remains in the solution at greater depths in the cell.

This phenomenon offers the possibility of continuous operation of cells by the addition of fresh silver bearing electrolyte at a controlled rate to the lower end of the cell, and removal of silver free electrolyte from the upper end of the cell. Thus, in the cell shown in FIGS. 1 and 2 silver bearing hypo solution is added continuously to the bottom of the cell through tube 16, while silver free hypo solution overflows through the outlet 17 at the same rate.

While the nature of the phenomenon which gives rise to the progressive depletion of the silver concentration of the electrolyte towards the upper end of the cell is not fully understood, it has been found that this is not a purely gravitational effect.

Figure 3:
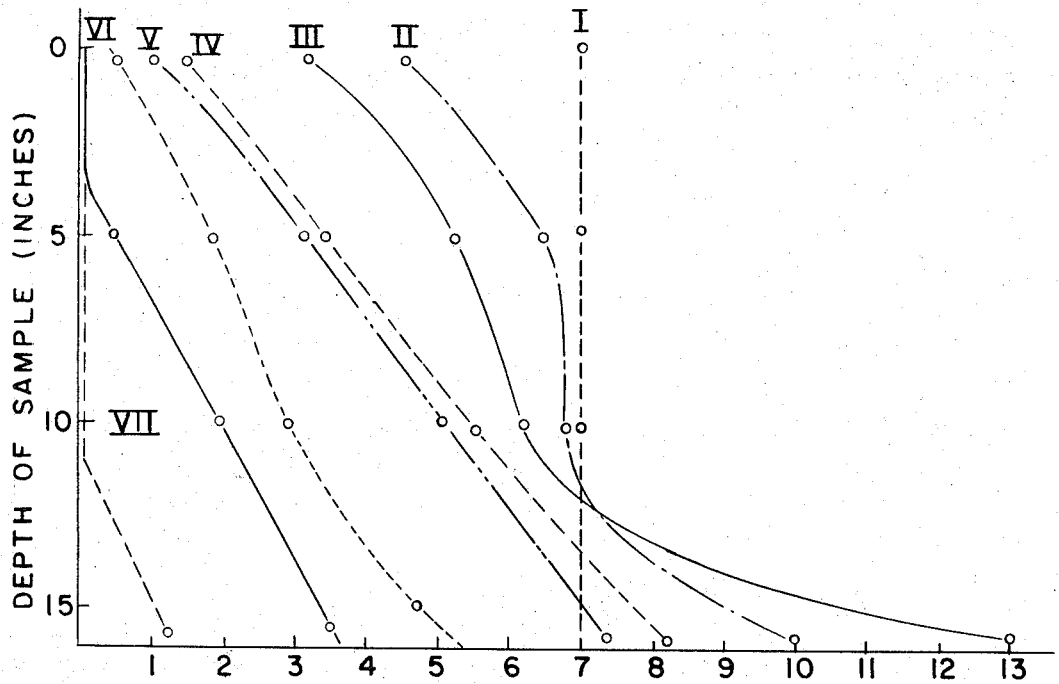
FIG. 3 is a graph illustrating the changes of silver concentration at different depths in a cell containing an electrolytic solution comprising silver-bearing photographic hypo solution at various stages of operation.

FIG. 3 shows the results of investigations of this effect made by the applicant, in the cell of the type shown in FIGS. 1 and 2 comprising a stainless steel cathode having a depth somewhat in excess of 15 inches and a second of 3 inches square, and an anode comprising a graphite rod of ¾ inches in diameter. FIG. 3 shows the plot of the silver concentration in grams per litre as measured at depth of 1, 5, 10, and 15 inches from the surface of the cell, the measurements being taken at various times after commencement of operation of the cell as follows:

| Curve | Hours |
|-------|-------|
| I | 00.00 |
| II | 04.00 |
| III | 08.00 |
| IV | 12.00 |
| V | 15.00 |
| VI | 19.30 |
| VII | 23.00 |
| VIII | 50.00 |

The cell was filled to the top with solution containing a silver concentration of approximately 7 grams per litre, the concentration being found to be constant at various depths in the cell.

The cell was energized and operated continuously for a period of four hours after which a further set of readings were taken as indicated by the curve II in FIG. 3. From this curve it will be seen that whereas the silver concentration at a depth of 10 inches had only slightly decreased, the concentration at the surface of the cell had decreased to approximately 4.5 grams per litre, and the concentration at the depth of 15 inches had increased to 10 grams per litre.

As indicated by curve III, after 8 hours of operation concentration at the surface of the cell had decreased to almost 3 grams per litre, whereas the concentration at a depth of 15 inches had increased to 13 grams per litre. From these curves it seems evident that the depletion of silver from the solution in the upper part of the cell is not purely the result of the electroplating action, but on the contrary the enrichment of the solution at greater depth in the cell seems to indicate a downward displacement of the silver in the cell.

Continued operation of the cell without addition of further silver bearing hypo resulted in a gradual depletion of the silver content of the electrolyte from plating the silver onto the cathode, whilst maintaining a concentration gradient from the top to the bottom of the cell, as indicated by curves IV, V and VI in FIG. 3.

After 23 hours of operation as indicated by curve VII the electrolyte in the upper part of the cell was substantially silver free, and after 50 hours of operation as indicated by curve VIII the electrolyte in the top ten inches of the cell was substantially silver free. It was found that the amount of silver plated onto the cathode increased progressively with depth in the cell.

While the applicants do not wish to be bound by any particular theory to explain this "concentration gradient" phenomenon, it is speculated that sulphate ions from the sodium thiosulphate which forms a main ingredient in photographic hypo solutions, migrate to the anode where their charge is neutralized, and subsequently tend to rise within the cell since their density is less than that of the electrolyte solution.

Whatever may be the correct explanation of this phenomenon, the applicants find that it can be taken advantage of in a practical manner by operating a low current density non-agitated cell, supplying silver bearing hypo solution continuously to the low end of the cell, and at the same time removing silver free hypo from the upper end of the cell in the manner described in relation to FIGS. 1 and 2.

While for best efficiency of the silver recovery process it is obviously desirable to operate the cell with a continuous supply of silver bearing hypo, it would nonetheless be possible to operate in a semi-continuous manner. For example, referring to FIG. 3 the cell could be operated without replenishment for a period of 50 hours until the condition indicated by curve VIII is reached, at which stage a further batch of silver bearing hypo solution could be added slowly to the bottom of the cell in a volume to displace the electrolyte from the top 10 inches of the cell.

Figure 5:
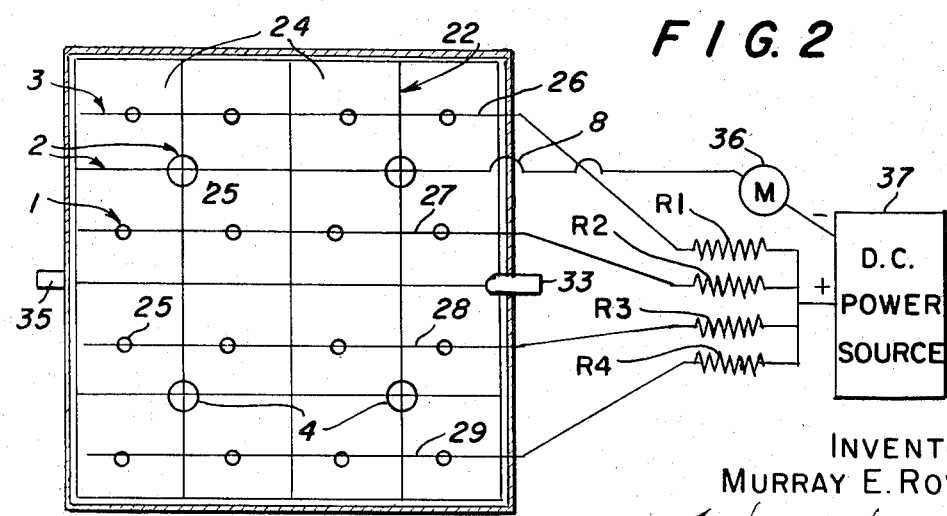
FIG. 5 is a somewhat schematic plan view corresponding to FIG. 4 and showing details of the power circuit.
Figure 4:
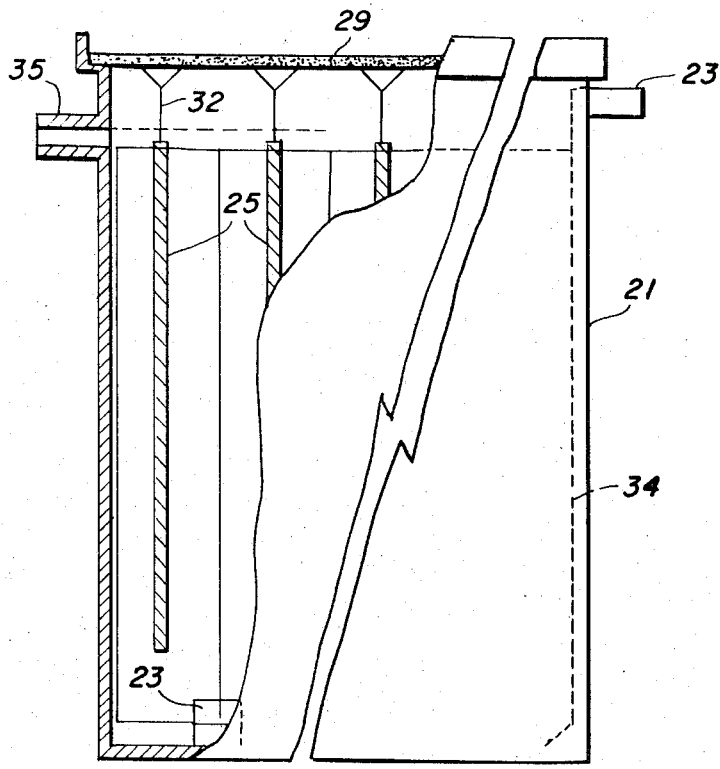
FIG. 4 is a fragmentary partly sectioned elevation of a preferred form of multiple cell electrolytic apparatus for the recovery of silver from photographic chemical solutions.

In practical applications it is desirable to provide a multi-cell electro-winning apparatus such as that illustrated in FIGS. 4 and 5 for the recovery of silver from photographic chemicals.

As illustrated in FIGS. 4 and 5 the electro-winning apparatus comprises a rectangular tank 21 within which is mounted a cathode assembly 22 which comprises two parallel series of vertical stainless steel plates arranged at mutually right angles and inter-leaved to define a cell like structure of vertically elongated cathode cells of square cross-section. The plates may be interconnected to form the structure in any fashion. For example, one series of plates may be slotted from their lower edges upwards to about half their depth at locations where they are to intersect with the plates of the other series, the latter plates likewise being slotted downwards from their upper edges at the same locations, so that the two series of plates may be moved vertically together by interengagement of their respective registering slots to provide the structure 22.

As it will be seen in FIG. 4 the lower end of the cathode assembly 22 is spaced some distance above the bottom of the tank, and rests on supports 23 which may be made of the same insulating material as the tank itself.

It will be seen from FIG. 5 the cathode assembly 22 defines an array of vertically extending square section cathode cells 24 in each of which is supported a corresponding anode 25. The anodes 25 are preferably cylindrical graphite rods, for example, where the cathode cells 24 are of 3 inch square, the anode rods may be of ¾ inch diameter. Each anode is supported from an anode suspension bar 26, 27, 28 or 29, the suspension means 32 being such as to support the anode in freely suspended vertical disposition.

Electrolytic solution, e.g. silver bearing hypo solution is supplied to the tank through an inlet 33 which communicates with a passage 34 to conduct the input supply to the bottom of the tank. Fluid output means to discharge silver free solution from the tank comprises an overflow connection 35 positioned just above the level of the top of the cathode assembly 22.

From the foregoing description it will be evident that the cathodes of all cells in the cathode assembly are electrically interconnected. The cathode assembly is connected in series with an ameter 36 with the negative terminal of a d.c. power source 37.

The anodes 25 are arranged in electrically isolated groups corresponding to the anodes suspension bar 26, 27, 28, 29, to which they are attached; the suspension means 32 and the suspension bars of course being electrically conducting. Each group of anodes is connected to the positive terminal of the power source 37 through an overload protection means in the form of a resistor $R_1$, $R_2$, $R_3$ and $R_4$ respectively. In the event of a short-circuit occurring in one of the anode groups, the corresponding resistor $R_1$, $R_2$, $R_3$ or $R_4$ is designed to dissipate all the electrical energy passing through that circuit and thus protects the power source 37 from being overloaded. Thus the voltage of the power source 37 is approximately 10 times the voltage required to operate the electrolytic cell, the resistors $R_1$, $R_2$, $R_3$ and $R_4$ each producing a voltage drop in normal operation of approximately 90 percent of the supply voltage.

Thus it will be seen that in the event of a short-circuit occurring in a cell of one group of anodes, the corresponding resistor protects the power source from overload, and the cells having anodes in the remaining groups continue to function.

This feature, coupled with the concentration gradient established within the cell during operation as discussed above, enables a cell assembly of the type shown in FIGS. 4 and 5 to be operated unattended for a lengthy period simply by adding a continuous or intermittent supply of silver bearing hypo solution.

In addition the apparatus has several features which reduce the likelihood of short-circuits developing in cells. In equipment of this type a common source of short-circuit arises as a result of "plate-outs," i.e. pieces of plated silver which become dislodged from the cathode assembly and form a contact between the cathode and the anode. The suspension mounting of the anodes in the apparatus of this invention permits the anode to be displaced laterally upon contact by a plate-out, thus increasing the probability that the plate-out may become dislodged and fall to the bottom of the cell. Furthermore, since the lower end of the cathode assembly is spaced above the bottom of the tank, and since the lower ends of the anodes 25 are spaced even higher, the probability of short-circuit occurring through plate-outs accumulated in the bottom of the tank is considerably reduced. Additionally, the high curvature of the anode rod due to its small diameter, coupled with the naturally high resistance of graphite, results in a high resistance contact area between a displaced "plate-out" and the anode, thus such a contact does not normally render that cell inoperative.

In reference to the apparatus shown in FIGS. 4 and 5, it will of course be observed that the electrolytic solution has free communication between the cells of the cathode assembly both at the top and the bottom thereof.

The apparatus can of course be provided with any desired number of cells, and in larger systems input of silver bearing electrolyte can be provided for at several locations in the bottom of the tank, removal of silver free electrolyte being provided for by a number of overflows to ensure even drainage from several points on the liquid surface.

The tanks 21 is preferably fabricated in, or at least lined with, a material which is resistant to attack by the electrolyte solution, in the present case photographic chemicals, and has a lid similarly protected provided with holes to permit dissipation of any gases generated in the cells.

I claim:

1. Electro-winning apparatus comprising a tank, a stainless steel cellular cathode assembly in said tank defining a plurality of vertically elongated electrolytic cells, said cells being in communication at least at their lower ends, an anode assembly in said tank comprising a plurality of elongated anodes and means suspending each anode to hang freely centrally in a corresponding one of said cells, means connecting said anodes in a number of electrically isolated groups, circuit means connecting each anode group and said cathode assembly to a source of d.c. current, said circuit means comprising a number of overload protection means each operatively associated with a corresponding one of said anode groups, means for supplying electrolyte to the lower end of said cells and overflow means at the upper end of the cells for removing electrolyte displaced by the addition of electrolyte to the bottom of the cells.

2. Apparatus according to claim 1, wherein said cathode assembly has an upper end which lies at a lower level than said overflow means, and a lower end spaced above the bottom of said tank, said anodes each having a lower end spaced above the lower end of said cathode assembly.

* * * * *